Patented Oct. 11, 1932

1,882,638

UNITED STATES PATENT OFFICE

LAMBERT D. JOHNSON AND NATHAN F. TRUE, OF EVANSVILLE, INDIANA, ASSIGNORS TO MEAD JOHNSON & COMPANY, OF EVANSVILLE, INDIANA, A CORPORATION OF INDIANA

POWDERED ACID MILK AND PROCESS OF PREPARING SAME

No Drawing. Application filed April 14, 1928. Serial No. 270,146.

This invention relates to improvements in powdered acid milk and processes of preparing same.

An acid milk is whole cow's milk, which has been either acidified by the addition of lactic or other acid or by culturing with acid producing organisms.

Lactic acid is preferably used to acidify the milk, and is herein referred to as the acidifying agent, but obviously other acids, such as citric acid, may be used.

Lactic acid milk is a concentrated food which may be fed to athreptic, (marasmic or atrophic) and other below weight infants (whose tolerance for fat and sugar has been lowered) in sufficient amounts to bring about a gain in weight without causing intestinal disturbance. It may be used successfully as a complemental food to breast milk, and as a diet for vomiting infants that do not do well on sweet milk mixtures.

The content of mineral or inorganic salts in cow's milk is three and one-half times as great as in breast milk. Some of these mineral constituents, especially the phosphates and calcium caseinate, absorb a part of the hydrochloric acid of the gastric secretions, thereby reducing the free hydrochloric acids of the secretions. This absorption is known as buffer action and the salts responsible for it are known as buffer substances. In young infants gastric digestion is at a minimum, and acid secretion is limited. The acidity of the gastric contents of infants suffering from infections of nutritional disturbances is lower than that of normal infants. It follows that a reduction of the already limited free acidity as by the buffer action of sweet cow's milk will interfere materially with gastric digestion in infants.

Buffer action has been described as the property of binding large amounts of acid and converting hydrogen into non-ionized form thus to all intents and purposes neutralizing the acid. The high buffer action of the cow's milk makes much of the gastric hydrochloric acid of the infant's stomach inactive.

The addition of acid, preferably lactic acid, to sweet cow's milk minimizes the buffer action of the milk so that the hydrochloric acid present in the stomach is free to exert its influence toward optimum gastric digestion. When lactic acid milk is fed undiluted to infants, the acidity or hydrogen ion concentration of the stomach content approximates that of the normal breast fed infant.

Powdered lactic acid milk as made in the past has not proven entirely satisfactory for use because it cannot be rendered sterile by boiling for the reason that when reliquefied and boiled it curdles to such an extent that it becomes unfit for use. A lactic acid milk product which is not adapted to be boiled to render it sterile it not uniformly safe for infants to consume.

Another objection to powdered lactic acid milk made by previously known processes is the darkening in color and change in taste which has resulted when the reconstituted product is boiled.

The object of this invention is to produce a powdered lactic acid milk which, when reconstituted with water, can be boiled to render it sterile without causing coagulation of the casein in the mixture.

Another object is to produce a powdered acid milk in which the physical and chemical constituents will not be appreciably changed by boiling the mixture when the powdered acid milk has been reconstituted with water.

Another object is to produce a powdered acid milk which, if boiled after having been reconstituted with water, will not become discolored.

In carrying out our improved process for preparing powdered lactic acid milk which is adapted to be boiled after being reconstituted with water, we proceed as follows:

Preferably, sweet whole cow's milk which has been standardized to a 3½ percent butter fat content, either by the addition of cream or skim milk, is boiled for one minute. To the milk is then added U. S. P. lactic acid until the free lactic acid in the milk is approximately 0.4 percent. Milk acidified to this extent curdles, the curd being in the form of relatively fine flocks. The boiling of the milk before acidifying it has the effect of producing a finer curd than is obtained when acid is added to raw or uncooked milk. The mixture of curd and whey is now run through a homogenizer at about 2000 pounds pressure for the purpose of breaking up the curd into finely divided particles.

An important step in our process is now to be described.

After homogenizing, the acidified milk is subjected to heat for the purpose of changing the character of the curd so that its coagulable property is substantially destroyed. A further purpose of the heat treatment is to render the mixture as nearly sterile as possible. The heat may be applied by various methods such as heating in a steam jacketed tank, injecting steam directly into the mixture in an open tank, or by injecting steam under pressure into the mixture in a closed tank. We prefer to inject steam under pressure into the acid milk in a closed tank which has at the top a vent pipe connected to the condenser and thence to a vacuum pump. We first exhaust the air from the tank holding the milk by means of the vacuum pump, then rapidly heat the mixture to boiling by injecting the steam. The vacuum in the tank will, of course, be lost but the air will have been replaced by steam.

This heating thus takes place in a practical absence of air, hence there is little or no oxidation to cause deterioration of the vitamins of the milk. The exhausted steam passing through the mixture and thence through the vent pipe causes the incoming steam to agitate the mixture thus keeping the finely divided particles of casein separated from each other.

After the heat treatment is completed the milk is rapidly cooled and is again homogenized at about 2000 pounds pressure and then spray dried. Drying is preferably accomplished by spraying the milk at about 2000 pounds pressure into a current of heated air in a drying chamber. This produces a fine powder of approximately 2 percent moisture. If the acid milk mixture were dried in an ordinary vacuum drum drier, the particles of the dried product would be coarse and would readily settle out of the reliquefied product, which would render it unsuitable for infant feeding purposes because the particles would be too large to readily pass through the orifice of a nipple. We have found that by using a spray drier as herein described for drying the unconcentrated mixture prepared according to our method, the insoluble constituents of the reliquefied milk are carried in suspension in a very fine state. The use of a spray dryer upon the acid milk in its dilute state is an important improvement in preparing acid milk for infant feeding.

The product is a fine powder substantially white in color, having a faint yellowish tint, a faintly acid odor and a pleasant, slightly acid taste. The approximate analysis is as follows:

| | Per cent |
|---|---|
| Protein | 26.00 |
| Lactose | 36.30 |
| Butter fat | 27.20 |
| Ash | 6.00 |
| Free lactic acid | 3.00 |
| Moisture | 1.50 |

The process described has the effect of destroying the coagulable property of the casein in the milk so that boiling of the reconstituted powdered lactic acid milk to render it sterile will have no undesirable effect upon the product.

It will be understood that the reconstituted lactic acid milk need not be boiled before being used, but if it is thought desirable to do so, such boiling will produce none of the undesirable conditions herein referred to.

We claim as our invention:

1. An improvement in processes of preparing powdered acid milk for infant feeding purposes, which when reliquefied may be boiled without curdling, which consists in increasing the temperature of acid milk in which precipitation of curd has taken place, to substantially the boiling point of the milk, until the coagulable properties thereof have been destroyed, agitating the same during said heat treatment, and then spray drying the product in its dilute form.

2. An improvement in processes of preparing powdered acid milk for infant feeding purposes, which when reliquefied may be boiled without curdling, which consists in injecting steam directly into acid milk in which precipitation of curd has taken place, to rapidly raise the temperature thereof to substantially the boiling point and simultaneously agitating the milk, then rapidly cooling the same, and spray drying the product in its dilute form.

3. An improvement in processes of preparing powdered acid milk for infant feeding purposes, which when reliquefied may be boiled without curdling, which consists in boiling milk and then treating it with acid to cause precipitation of a fine curd, then increasing the temperature of the acid milk until its coagulable properties have been destroyed, then cooling and spray drying the product.

4. The process of preparing powdered acid milk for infant feeding purposes, which when reliquefied may be boiled without curdling, which consists in boiling milk for about one minute, then treating it with acid to form curd and whey, homogenizing the mixture of curd and whey, then rapidly increasing the temperature of the mixture to substantially the boiling point thereof until its coagulable properties have been destroyed, cooling the same, and then spray drying the product.

5. The process of preparing powdered acid milk for infant feeding purposes, which when reliquefied may be boiled without curdling, which consists in boiling milk for about one minute, then treating it with acid to form curd and whey, then rapidly increasing the temperature of the mixture to substantially the boiling point thereof until its coagulable properties have been destroyed, rapidly cooling the same, again homogenizing the mixture and then spray drying the product.

6. The process of preparing powdered acid milk which consists in boiling sweet milk for about one minute, adding lactic acid to increase the acidity to about .4% to form curd and whey, homogenizing the mixture of curd and whey, rapidly heating the mixture by injection of steam therein, to substantially the boiling point thereof in a practical absence of air to destroy the coagulable properties and render the product practically sterile, agitating the mixture during the heat treatment, rapidly cooling the same, again homogenizing the mixture and then spray drying it in its dilute state.

In testimony, that we claim the foregoing as our invention we affix our signatures this 9th day of April, 1928.

LAMBERT D. JOHNSON.
NATHAN F. TRUE.